United States Patent
Wei et al.

(10) Patent No.: US 12,460,882 B2
(45) Date of Patent: Nov. 4, 2025

(54) PASSIVE FLOW CONTROL FOR CAPTIVE VORTEX

(71) Applicant: Worcester Polytechnic Institute, Worcester, MA (US)

(72) Inventors: Chuming Wei, Worcester, MA (US); James L. Urban, Worcester, MA (US); Ali S. Rangwala, East Lyme, CT (US)

(73) Assignee: Worcester Polytechnic Institute, Worcester, MA (US)

( * ) Notice: Subject to any disclaimer, the term of this patent is extended or adjusted under 35 U.S.C. 154(b) by 228 days.

(21) Appl. No.: 18/077,637

(22) Filed: Dec. 8, 2022

(65) Prior Publication Data

US 2023/0175793 A1 Jun. 8, 2023

Related U.S. Application Data (60) Provisional application No. 63/287,250, filed on Dec. 8, 2021.

(51) Int. Cl.
  *F28F 13/12* (2006.01)
  *F28F 13/02* (2006.01)
  *F28F 13/14* (2006.01)

(52) U.S. Cl.
  CPC .............. *F28F 13/12* (2013.01); *F28F 13/02* (2013.01); *F28F 13/14* (2013.01); *F28F 2250/10* (2013.01)

(58) Field of Classification Search
  CPC .. F28F 13/12; F28F 13/02; F28F 13/14; F28F 2250/10
  USPC ..................................................... 165/109.1
  See application file for complete search history.

(56) References Cited

U.S. PATENT DOCUMENTS

| | | |
|---|---|---|
| 5,311,931 A | 5/1994 | Lee |
| 6,900,990 B2 | 5/2005 | Tomioka |
| 7,212,403 B2 | 5/2007 | Rockenfell |
| 8,422,218 B2 | 4/2013 | Fried et al. |
| 2015/0192373 A1 | 7/2015 | Kucherov et al. |

(Continued)

FOREIGN PATENT DOCUMENTS

| | | |
|---|---|---|
| CN | 10866294 A | * 10/2018 |
| CN | 110998213 A | * 4/2020 |

(Continued)

OTHER PUBLICATIONS

International Search Report, PCT/US2022/052251, Apr. 14, 2023, pp. 1-4.

*Primary Examiner* — Davis D Hwu
(74) *Attorney, Agent, or Firm* — Armis IP Law, LLC (57) ABSTRACT

A passive vortex formed or induced from a temperature difference across a cavity or void aggregates and supports a horizontal flow over the top of the cavity. A cavity of a suitable depth and width exhibits a small difference in temperature, or heat source, along the sides or bottom of cavity. A resulting convective flow tends to form a rising current along a warmer side, and a complementary downward current on an opposed side of the cavity. The formed vortex tends to draw the cooler downward flow across the warmer, heated surface, enhancing the vortex flow. The vortex aligns with a horizontal flow across the top of the cavity as the upward current complements the downward current on an opposed side of the cavity. A plurality of adjacent cavities tend to align with an aggregate horizontal flow contributed from each cavity.

7 Claims, 7 Drawing Sheets

(56) References Cited

U.S. PATENT DOCUMENTS

2019/0287878 A1 9/2019 Garcia-Polanco et al.
2021/0048255 A1* 2/2021 de Bock ............... H01L 23/467

FOREIGN PATENT DOCUMENTS

JP           3939648 B2    7/2007
KR      20040078117 A  *  9/2004

* cited by examiner

PASSIVE FLOW CONTROL FOR CAPTIVE VORTEX

RELATED APPLICATIONS

This patent application claims the benefit under 35 U.S.C. § 119(e) of U.S. Provisional Patent App. No. 63/287,250, filed Dec. 8, 2021, entitled "PASSIVE FLOW CONTROL FOR CAPTIVE VORTEX," incorporated herein by reference in entirety.

BACKGROUND

Thermal management is often beneficial to prevent overheating of mechanical and electronic processes. Friction between moving parts and electrical resistance in circuits are common reasons driving a need for exhaustion of waste heat. Often either liquid or gaseous flow, such as air or water, is flowed past a thermally conductive surface in communication with the source of the waste heat for transfer thereof. Mechanically driven devices, such as fans and pumps, are often employed for forcing the conductive fluid past the conductive surface, requiring additional electrical or combustive activity.

SUMMARY

A passive vortex formed or induced from a temperature difference across a cavity or void aggregates and supports a horizontal flow over the top of the cavity. A cavity of a suitable depth and width exhibits a small difference in temperature, or heat source, along the sides or bottom of cavity. A resulting convective flow tends to form a rising current along a warmer side, and a complementary downward current on an opposed side of the cavity. The formed vortex tends to draw the cooler downward flow across the warmer, heated surface, enhancing the vortex flow. The vortex aligns with a horizontal flow across the top of the cavity as the upward current complements the downward current on an opposed side of the cavity. A plurality of adjacent cavities tend to align with an aggregate horizontal flow contributed from each cavity.

In a particular configuration, a heating appliance generates a vortex based on a horizontal flow captured from waste heat for directing or exhausting heat from the heat source. An interconnection of surfaces varying in thermal conductivity or temperature is arranged in the path of a fan or convection flow for initiating a passive vortex continuing or aggregating the flow for efficient heat transfer, typically for cooling an apparatus or machine where the heat is generated.

In operation as discussed below, a heat transfer apparatus as disclosed herein has a conduit including at least a portion of a material having a high thermal conductivity, such that the conduit is adapted for transporting a heated flow, and a cavity in fluidic communication with the conduit. The cavity has one or more walls defined by a low thermal conductivity, such as an insulating portion, and a heat source is in thermal communication with either of the conduit or cavity portion exhibiting higher heat.

In the example arrangement, the cavity includes a plurality of walls, in which at least one of the walls has or acquires a higher temperature and conducts more heat than the other walls. The high thermal conductivity wall is in a parallel plane with the high thermal conductivity portion of the conduit, which may be a bottom of the cavity when the conduit is horizontal. To sustain the vortex, the conduit has a continuous surface with the cavity, such that the cavity has at least one wall parallel to the continuous surface in the conduit and at least one wall substantially perpendicular to the continuous surface in the conduit. The resulting cavity contains the vortex which becomes passive as a result of the arrangement of the differing thermal conductivities of the materials that define it.

In implementation, a method of generating a horizontal convective flow includes forming a cavity enclosed by a plurality of walls adjacent a flow surface flush with a top of the cavity, and generating a heat differential between one of the plurality of walls and at least one other wall of the plurality of walls. The heat differential induces a convective flow towards the top of the cavity, and forms a vortex within the cavity based on a cyclic flow along the plurality of walls. The vortex may aggregate with other nearby or adjacent cavities for an accumulated flow in a common direction, for receiving a horizontal flow along the flow surface and aligned with the vortex at the top of the cavity.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The description below presents an example configuration for a flow generation device with no moving parts which operates by using waste heat to form a vortex that induces a flow from a free convection current which in turn can be used to enhance cooling/heating or directing a flow of heated air.

Figure 1:
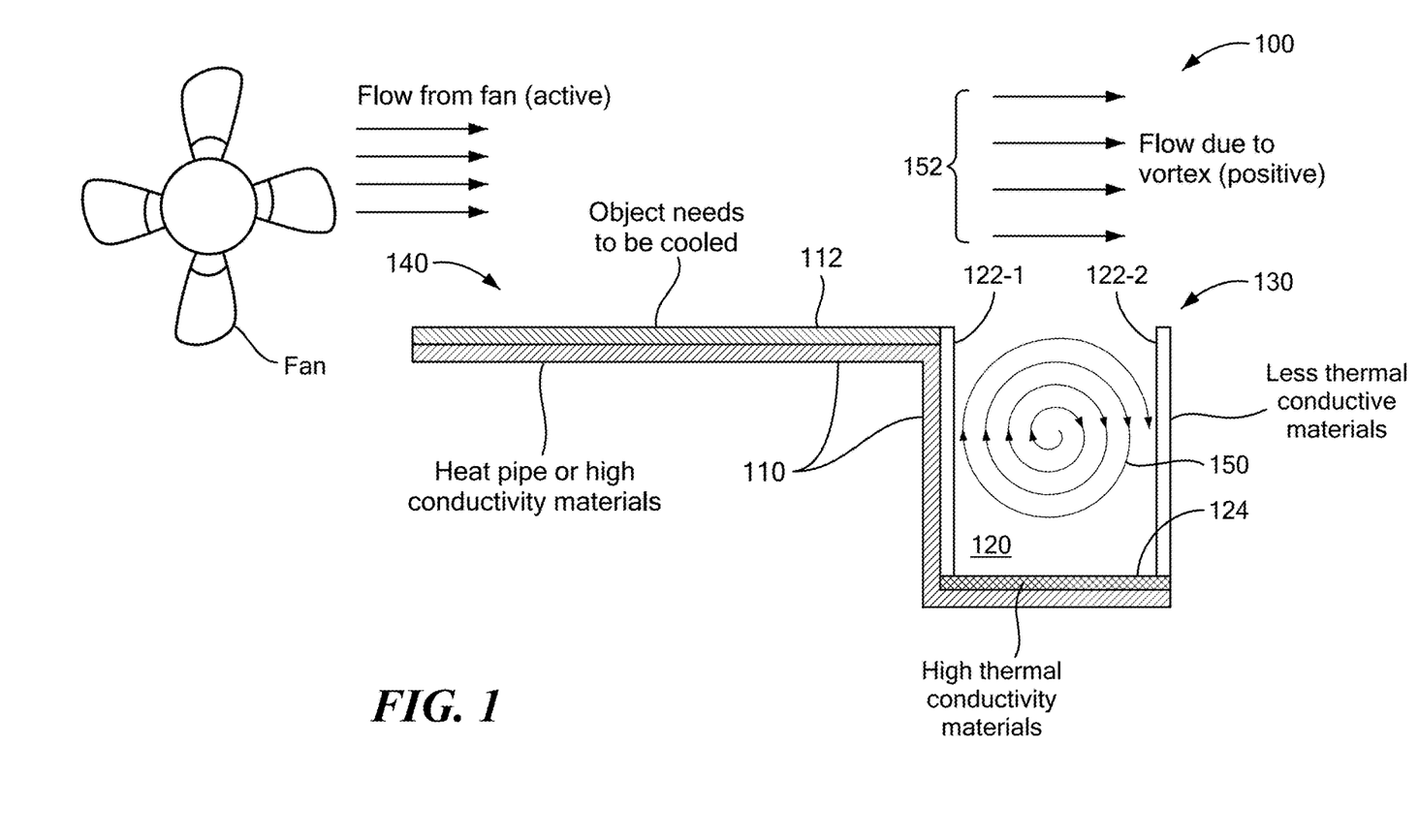
FIG. 1 shows a schematic view of a configuration of the claimed approach.

FIG. 1 shows a schematic view of a configuration of the claimed approach. A thermal or convective flow device 100 includes a heated surface 110 in thermal communication with an object 112 or surface to be cooled. A cavity 120 is defined by walls 122-1 . . . 122-2 (122 generally) and a bottom 124 or floor, adjacent a flow surface 140 flush with a top 130 of the cavity 120. Collectively the walls 122 form a plurality of side surfaces to define an enclosed interior of the cavity 120, which may form a polygonal, square and/or sloped cavity for enclosing a vortex 150, meeting at the bottom 124 surface adjacent the side surfaces defined by the walls 122. A heat source is thermally engaged with at least one of the side surfaces and the bottom 124 surface, or on the flow surface, such that the heat source defines a thermal difference between at least one of the side surfaces and the bottom of the cavity 120. The heat source induces a vortex flow in the cavity, where the vortex 150 is aligned with a fluidic flow 152 across the flow surface 140 at the top 130 of the cavity. An initial heating may occur along any of the walls 122, bottom 124 or flow surface 140, and will commence a cyclic convective flow across the flow surface and complementary vortex 150 in one or more cavities 120. A fan may assist with commencing or augmenting the flow 152.

In the configuration of FIG. 1, cooling or heating is provided by a cavity where a portion of the walls and bottom are heated, and the rest of the surface is a lower conductivity (insulating) material, such as wall 122-2. Successful operation is based on a portion of the interior surface of the cavity being heated to create a self-sustaining vortex which drives a forced flow across the object to be cooled (or heated). The cavity can be virtually any shape, although the shape made require specific size and placement of the heated portion. In FIG. 1, the side surfaces (walls 122) are defined by a plurality of opposed surfaces including at least one non-thermally engaged surface. The plurality of surfaces define a temperature differential between at least two of the opposed surfaces, such that the temperature differential results in a cyclic convective flow across the opposed surfaces and across an open void, or top 130, aligned with the flow surface 140. A cubic shaped cavity is particularly illustrative because of having two pairs of opposed walls 122 corresponding to sides of the vortex, but any suitable shape may suffice.

The impact of the cavity geometry is described further below. In a configuration involving a distinct heated floor, a stable vortex is observed under certain conditions. It is found that when the aspect ratio (height to width ratio) is below 0.6 (approximately), the cavity behavior is unstable, but when the aspect ratio is above this value, a stable vortex forms in the cavity. Increasing the aspect ratio further leads to multiple vertically aligned vortices It is found that when the aspect ratio is at a minimal values (≈0.6), a strong, horizontal mass flow is observed over the cavity 120 and the strength of the top vortex, measured in terms of its circulation, is maximized. Particularly advantageous is a scaled approach involving many adjacent cavities 120-1 . . . 120-N across a surface 140 to be cooled, or for extracting a heat flow from solar irradiation of a panel or array of cavities, for example.

In exemplary use cases, the ability of this partially heated cavity to induce a horizontal flow in a duct has been reproduced through two dimensional (2-D) and three-dimensional (3-D) modelling. The results show that it is possible to create a net horizontal flow in the duct-cavity system and that device operation is steady. For a 2-D open-top cavity in a duct, when the temperature of hot surface smaller than 100° C., induced air mass flux reaches the peak value when the size of duct is 2 cm. A Further increase in the size of the duct may not benefit air mass flux. For the 3-D open-top cavity in a duct, as the cavity depth increases from 4 to 7 cm, the induced air mass flux remains relatively stable, thus the the induced air mass flux exhibits independence of depth.

Figure 2A:
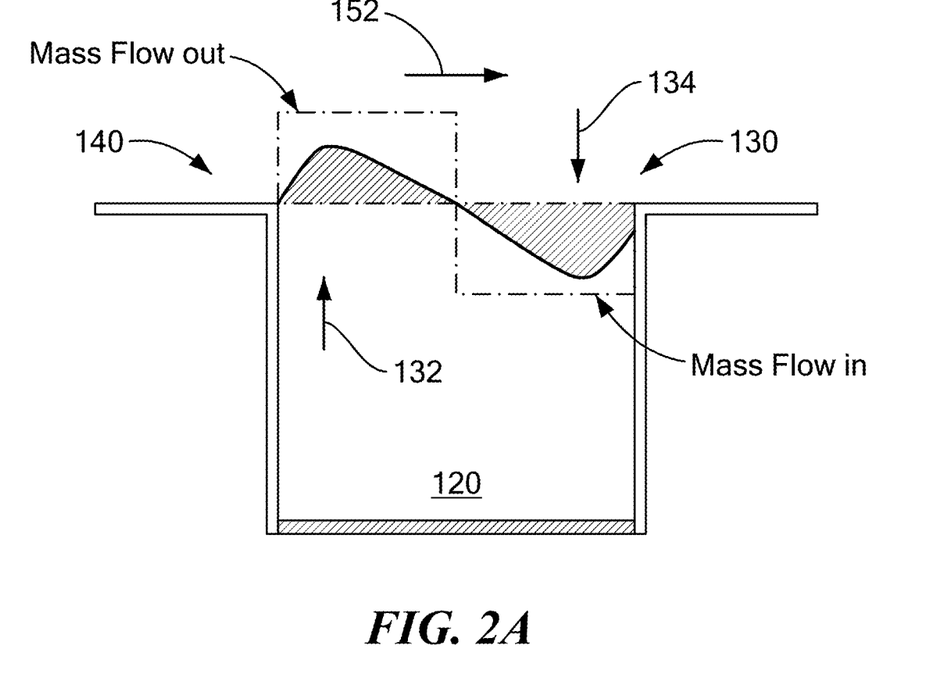
FIGS. 2A-2B are diagrams of fluidic flow in the configuration of FIG. 1.
Figure 2B:
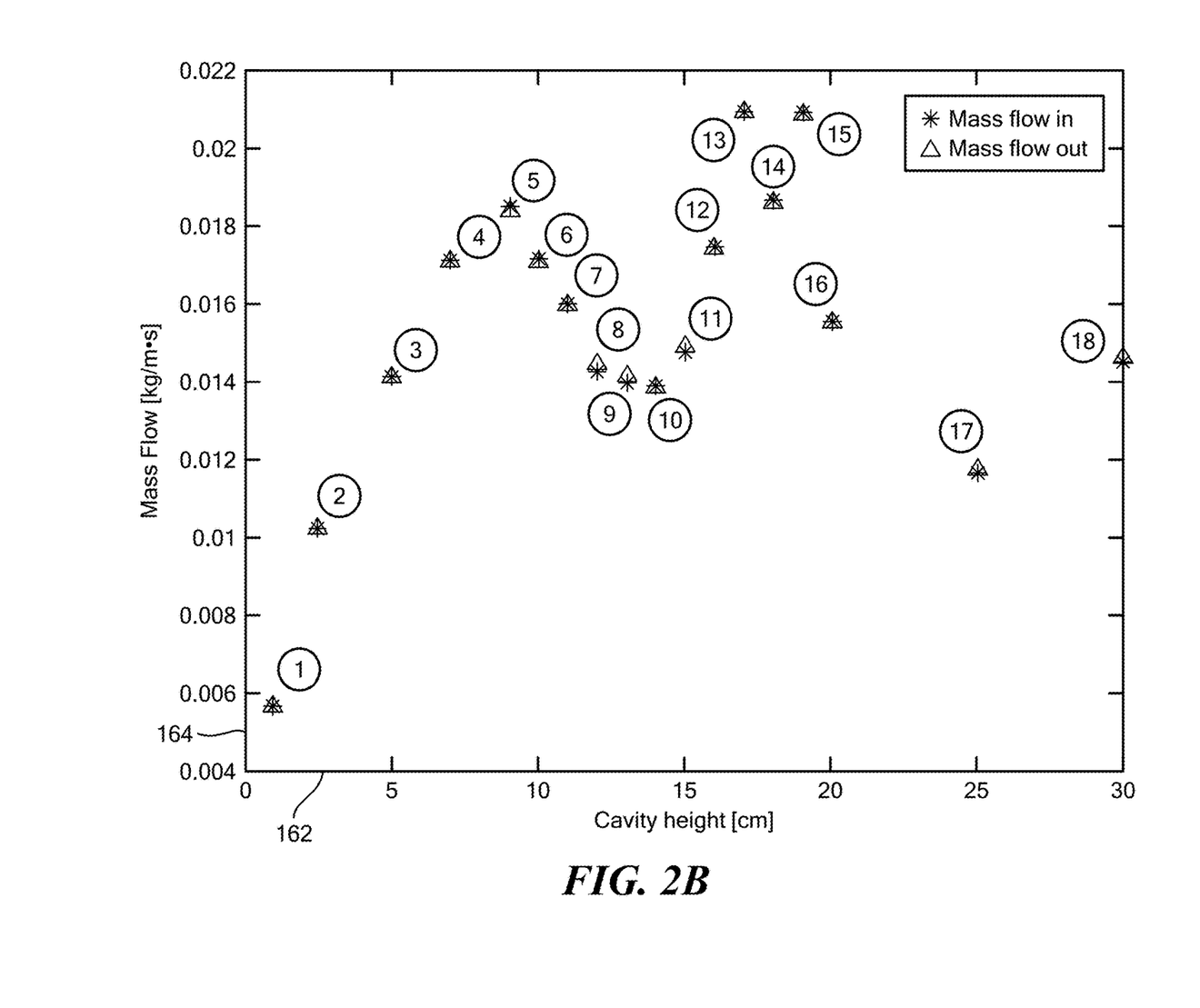

FIGS. 2A and 2B show fluidic flow in the configuration of FIG. 1. Referring to FIGS. 1 and 2A-2B, mass flow at the mouth or top 130 of the cavity 120 is directly related to the air entrainment between the cavity inside domain and the outside domain. Understanding the parameters that affect the mass flow will aid in understanding the behavior of a resulting thermal plume. The outline 132 of the mass flow at the mouth of the cavity is complemented by the inflow 134.

The air mass flow, $\dot{m}'$, may be calculated by density $\rho$ and velocity v, is expressed in the equation below.

$$\dot{m}' = \rho \times v \times \text{grid size}$$

As alluded above, the single cavity is an example; the flow surface 140 may further comprises a plurality of cavities, each forming a vortex 150 aligned with the fluidic flow to combine in an aggregate horizontal heat flow in the same direction. FIG. 2B shows the air mass exchange at the mouth of the cavity 120 and the resulting horizontal flow 152. It can be observed that as the cavity height on axis 162 increases when the vortex formed, the rate of mass exchange (axis 164) increases until the cavity height is 9 cm. When the cavity height increases from 9 cm to 14 cm, the rate of air mass exchange decreases because the position of the vortex 150 shifts as the vortex gradually enters the cavity completely and become stable. Subsequently, a small unstable vortex at lower level of the cavity pushes up the main vortex and disposes the main vortex outside the cavity, so the rate of air mass exchange increases until cavity height increases to 19 cm. When the cavity height is between 20 to 25 cm, the rate of air mass exchange decreases because the upper vortex becomes stable and gradually moves into the cavity 120. At a cavity height of 30 cm, the rate of air exchange increases because three vortices are formed, and the part of the top vortex is exposed outside the cavity. The rate of air mass exchange at the top 130 of the cavity 120 is dependent on the cavity height, as the height of the cavity can determine the formation and position of the vortex 150. Multiple vortices may form, and a position of the topmost is significant in affecting the aligned horizontal flow.

Figure 3A:
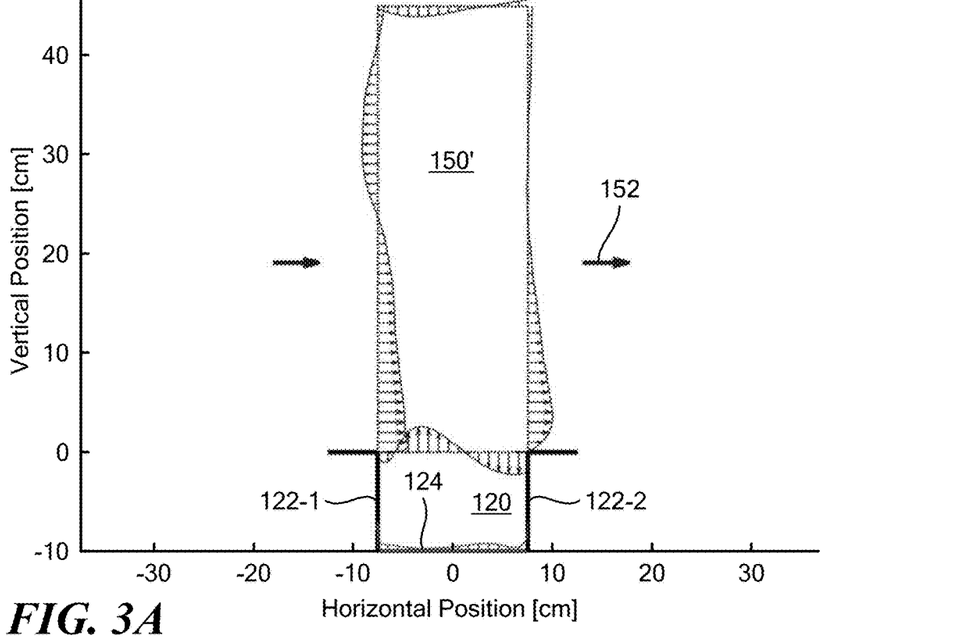
FIGS. 3A and 3B depict a vortex induced horizontal flow based on the flow of FIGS. 2A and 2B.
Figure 3B:
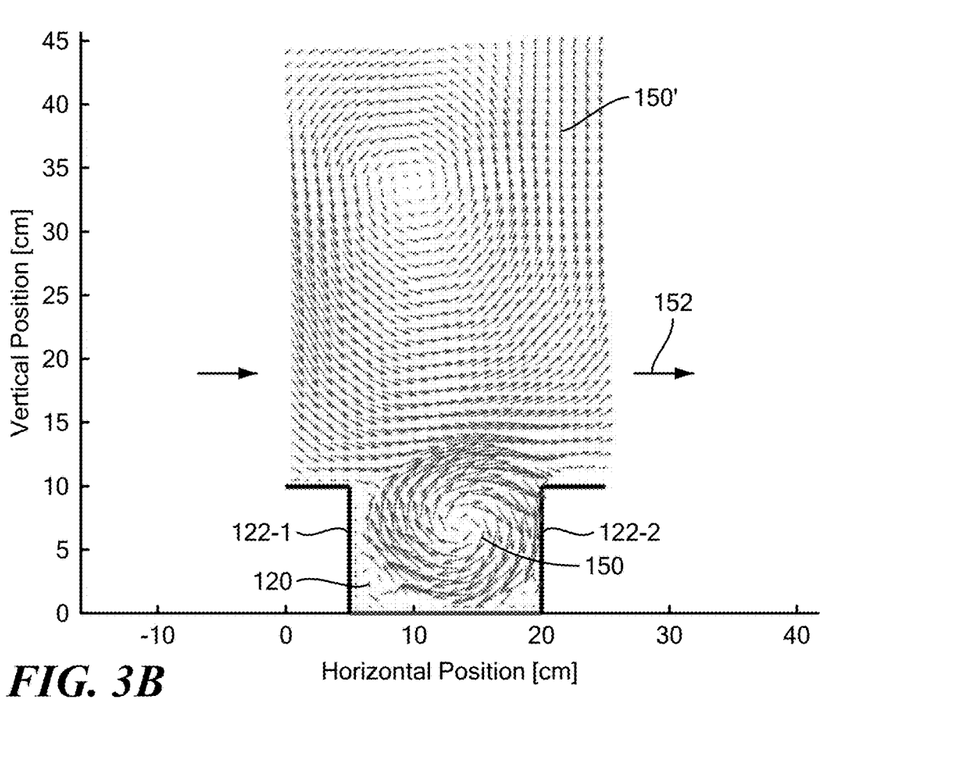
Figure 4A:
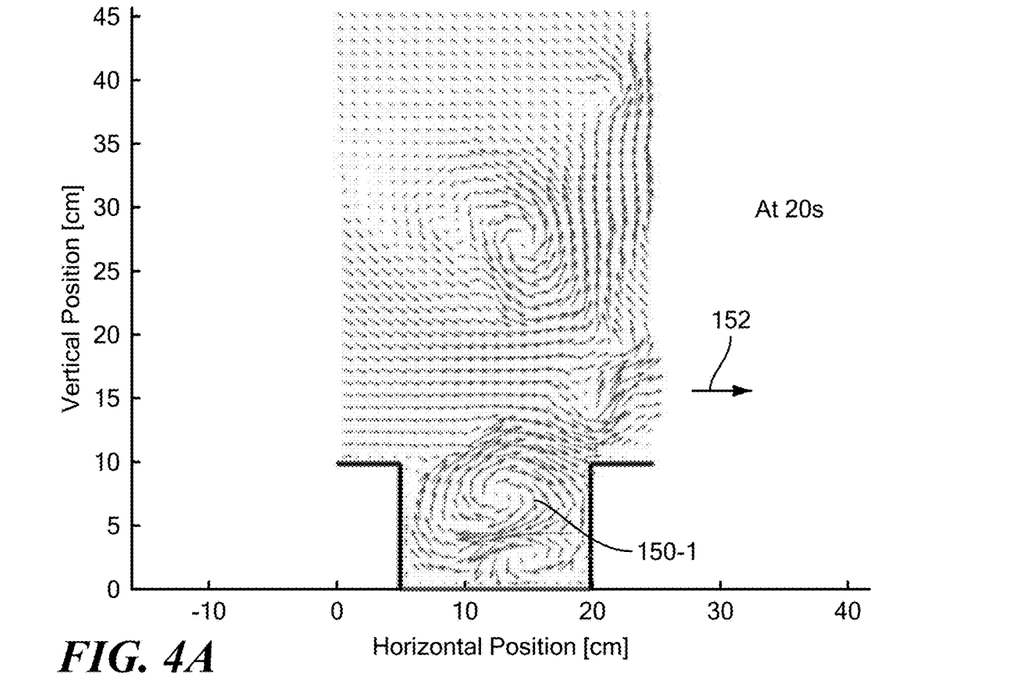
FIGS. 4A-4D show a progression of vortex formation from convective currents illustrated in FIGS. 1-3B.
Figure 4B:
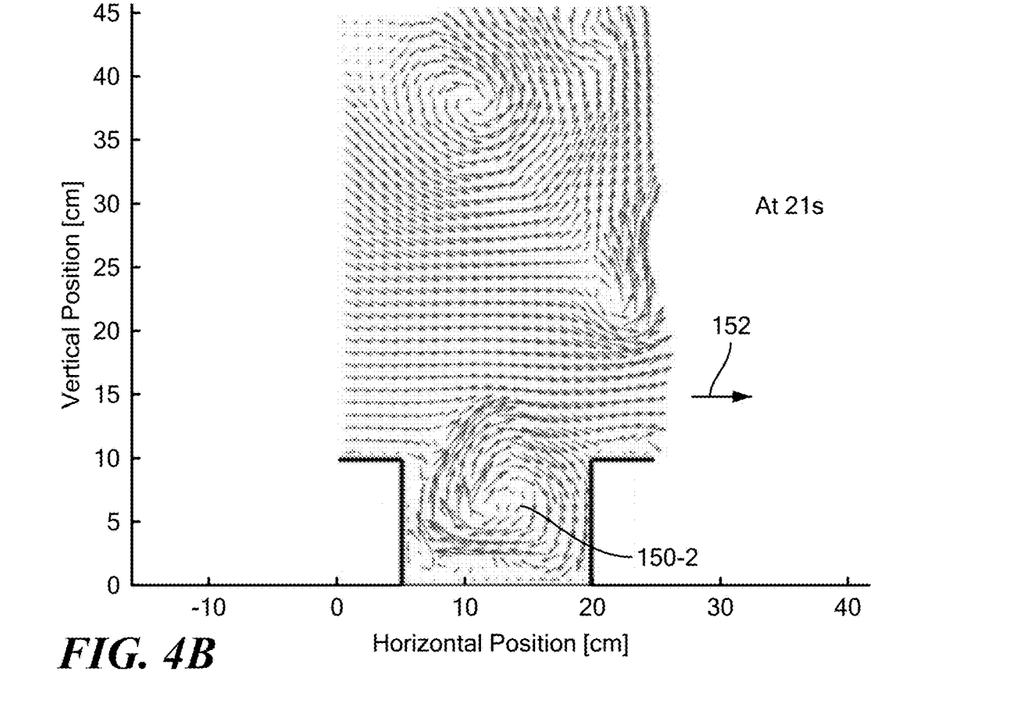
Figure 4C:
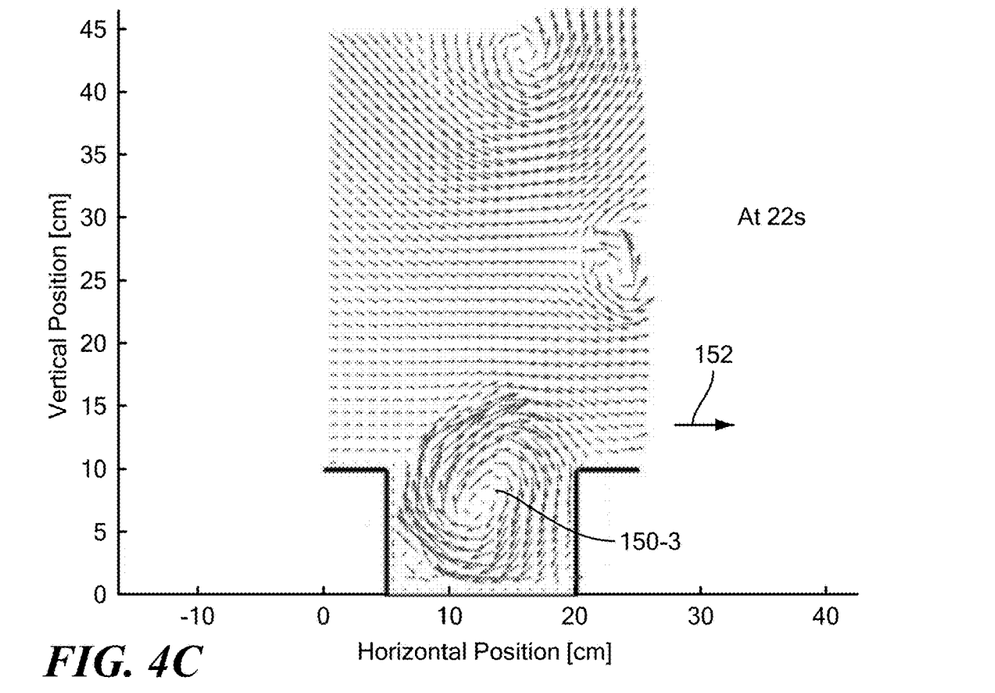
Figure 4D:
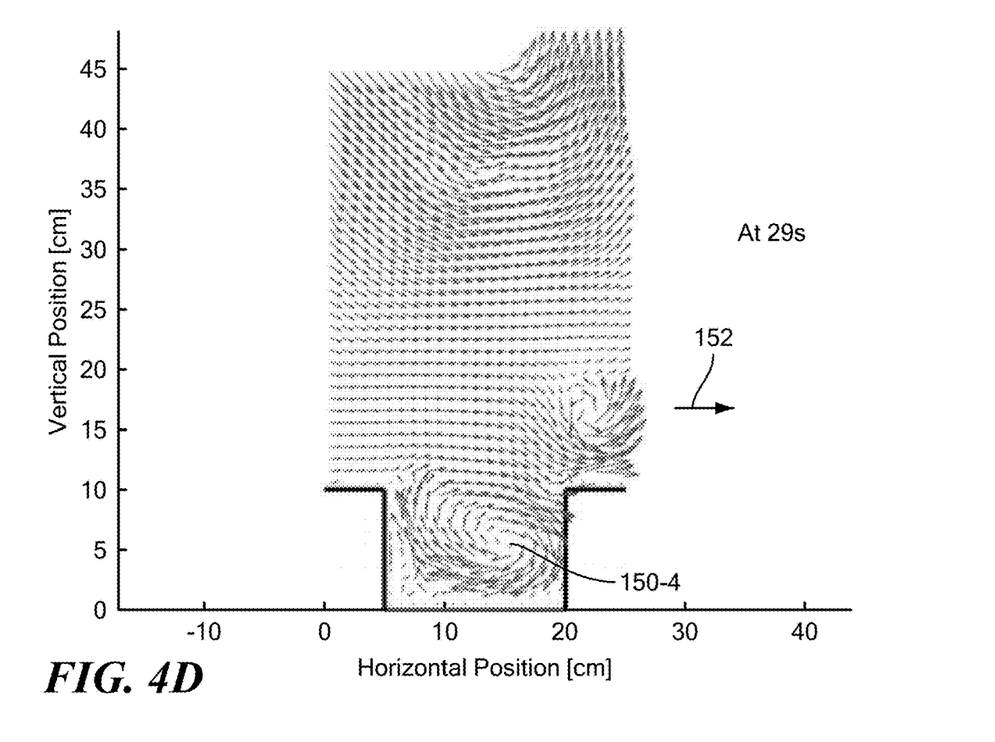

FIGS. 3A and 3B depict a vortex induced horizontal flow based on the flow of FIGS. 2A and 2B. Referring to FIGS. 1-3B, the cavity 120 has a depth and a width based on the walls 122 and bottom 124. Generally, the depth is defined by a point in the cavity most distal from the flow surface and the width defined by the open void at the top 130, such that the depth is at least 0.6 times the width for generating the vortex 150. FIG. 2A illustrates time-averaged computational fluid dynamics simulation results of the formation of a natural vortex in a cavity 120 that is heated at the bottom 124. The vortex creates a horizontal flow from L to R as shown in FIG. 3B.

FIG. 3A therefore depicts a simulation in a cavity with a heated floor and two adiabatic walls. Time evolution results are shown. In FIG. 2A, the small arrows show the magnitude and direction of the air flow at different positions in the domain. The result shows that a vortex is naturally induced in the cavity because of the geometry and the heated surface. The vortex then moves flow in area 150' above the cavity 120 in a horizontal direction, creating a natural pump as in FIG. 3B.

FIGS. 4A-4D show a progression of vortex formation from convective currents illustrated in FIGS. 1-3B. In FIGS. 4A-4D, a progression of a vortex 150-1 . . . 150-4 is shown resulting from the heated bottom 124 of FIGS. 3A-3B. An even or uniform heating along the bottom 124, or alternatively the sides or surface adjacent the top 130, will commence a convective flow that tends towards a vortex as the initial convective current become cyclic. Each of the side surfaces 122-N may further comprise a plurality of surfaces in a concave arrangement, leading to a polygonal or curved arrangement, but nonetheless defining a cavity 120 suitable for maintaining the vortex 150.

This may be further combined as a plurality of cavities, each cavity having an open void aligned with the flow surface, and each cavity of the plurality of cavities having a vortex aligned with the fluidic flow. Therefore, even if the vortex 150 contributed by an individual cavity 120 is relatively small, an arrangement or network of cavities on a common surface aggregate each respective flow 152 to form an appreciable aggregate flow.

Therefore, configurations disclosed above operate at multiple scales, ranging from small-scale (mm) to large scale (km). In other words, the cooling or heating of substrates using a passive vortex generated by cavities can be applied to chip cooling in electronics, larger scale cooling of data banks, transformers or other equipment where heat dissipation is needed. The approach can also be applied in design of industrial facilities, where plant site locations can be chosen such that the terrain (naturally or artificially created) promotes a vortex formation thereby causing a naturally induced wind draft in a single direction independent of weather patterns. Such a design is highly conducive in containing smoke and or other toxic dispersants into a narrower affected area.

The initial heating for vortex-generating current may emanate from a waste heat or other suitable heat source. The use of a passive, waste heat source to induce or increase a horizontal flow to enhance cooling or directing airflow has not been demonstrated in conventional approaches. Conventional approaches to thermal management generally encompass. four categories: 1) heat sinks; 2) fans; 3) liquid cooling; and 4) heat pipe or combinations of these.

In the first category, a fan with a generous surface area is attached directly onto the CPU chip with either thermal grease or a thermal pad wedged between the two. Since the metal in the heat sink conducts heat much more readily compared to the CPU chip, it quickly dissipates the heat generated.

In the second category, an exemplar is the air flow heat rejection system described by U.S. Pat. No. 7,212,403B2. This patent uses one or more fans combined with baffles or ducts for directing the flow of air sequentially to the components or heat exchangers for the components.

In the third category, an exemplar is the electronic apparatus provided with liquid cooling type is described in U.S. Pat. No. 6,900,990B2. This relates to an electronic apparatus provided with a cooling unit that cools circuit components, such as a microprocessor.

In the fourth category, an exemplar is a liquid cooled condenser for so-called "Loop Heat Pipe Like" enclosure cooling, as in U.S. Pat. No. 8,422,218B2. The core of this patent is a distinctive approach for Loop Heat Pipes, Capillary Pumped Loops and derivatives of Loop Heat Pipes that included devices like pumps in the condenser lines.

Figure 5:
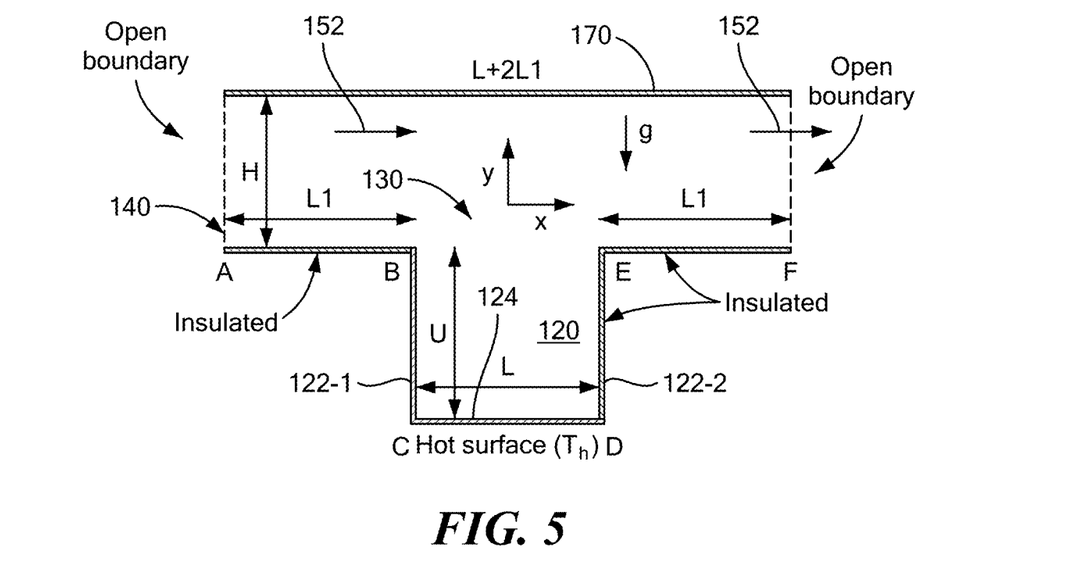
FIG. 5 shows a schematic view of a prototype for vortex induced flow based on FIGS. 1-4D.

FIG. 5 shows a schematic view of a prototype for vortex induced flow based on FIGS. 1-4D. Configurations above depict a fluidic flow driven by a convective vortex in the region 150' above the vortex cavity 120. This region may be open or closed; in the case of a heating duct or captured flow, a partially enclosed conduit channels the generated horizontal flow as in FIG. 5. Referring to FIGS. 1-5, In the preceding configurations, depicting an open-top cavity in a large domain, it was observed that a horizontal airflow 152 over the cavity 120 could be induced by the captive vortex in the cavity 120. An alternate configuration leverages the ability of this captive vortex to drive fluid flow in a duct 170. This was accomplished by modifying the configuration used in the previous section to include a "roof" or "ceiling" to create a duct configuration. The cavity may still be defined by a polygonal shape having a bottom parallel to the flow surface, such that the bottom 124 is in a perpendicular arrangement with the plurality of the side surfaces.

The duct arrangement of FIG. 5 depicts a method of generating a horizontal convective flow by forming a cavity 120 enclosed by a plurality of walls 122 adjacent a flow surface 140 flush with a top 130 of the cavity 120. An active or spontaneous thermal introduction generates a heat differential between one of the plurality of walls 122 and at least one other wall of the plurality of walls 122-N, such that the heat differential induces a convective flow towards the top 130 of the cavity 120 and forming a vortex within the cavity based on a cyclic flow along the plurality of walls. A duct 170 formed along the top 130 receives the horizontal flow 152 along the flow surface 140 and aligned with the vortex at the top of the cavity.

The schematic of the open-top cavity 120 in the duct 170 configuration with the bottom 124 and left wall 122-1 heated two-dimensional computational domain is illustrated for providing the thermal differential, however any suitable thermal source may be employed. The origin of the coordinate system is shown by the x and y axes and located at the center of the mouth (top 130) of the cavity 120. The computational domain is formed by cavity domain and duct domain. The cavity domain is formed by right insulated (adiabatic) wall 122-2 and left heated wall with the height of U, a heated floor with the width of L and left heated wall 122-1 are held at a constant temperature $T_h$. Above the cavity is the external (duct) portion of the domain which extends vertically some distance H and extends some distance L1 in either direction horizontally from the horizontal edges of the cavity, all surfaces other than the bottom 124 and left wall 122-1 are considered to be adiabatic/insulated. The top of the duct domain is an insulated ceiling with the width of L+2L1. The remaining two boundaries of the external portion of the domain are considered 'open' to air at ambient conditions for an input and outflow 152 of heating output.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A thermal device, comprising:
    a cavity having walls adjacent a flow surface flush with a top of the cavity;
    a plurality of opposed side surfaces defining an interior of the cavity;
    a bottom surface adjacent the opposed side surfaces; and
    a heat source thermally engaged with at least one of the opposed side surfaces and the bottom surface, the heat source defining a thermal difference between at least one of the opposed side surfaces and a bottom of the cavity, the heat source inducing a vortex flow in the cavity, the vortex aligned with a fluidic flow across the flow surface at the top of the cavity,
    the plurality of opposed side surfaces defining a temperature differential between at least two of the opposed side surfaces, the temperature differential resulting in a cyclic convective flow across the opposed side surfaces and across an open void aligned with the flow surface.

2. The device of claim 1 wherein the opposed side surfaces further comprise a plurality of surfaces in a concave arrangement.

3. The device of claim 1 wherein the opposed side surfaces include at least one non-thermally engaged surface.

4. The device of claim 1 further comprising a plurality of cavities, each cavity having an open void aligned with the flow surface, each cavity of the plurality of cavities having a vortex aligned with the fluidic flow.

5. The device of claim 1 wherein the cavity has a depth and a width, the depth defined by a point in the cavity most distal from the flow surface and the width defined by the open void, the depth at least 0.6 times the width.

6. A thermal device, comprising:
  a cavity having walls adjacent a flow surface flush with a top of the cavity;
  a plurality of opposed side surfaces defining an interior of the cavity;
  a bottom surface adjacent the opposed side surfaces, the cavity defined by a polygonal shape having the bottom surface parallel to the flow surface, the bottom surface in a perpendicular arrangement with the plurality of the opposed side surfaces; and
  a heat source thermally engaged with at least one of the opposed side surfaces and the bottom surface, the heat source defining a thermal difference between at least one of the side surfaces and a bottom of the cavity, the heat source inducing a vortex flow in the cavity, the vortex aligned with a fluidic flow across the flow surface at the top of the cavity.

7. The device of claim 1 wherein the flow surface further comprises a plurality of cavities, each cavity forming a vortex aligned with the fluidic flow.

\* \* \* \* \*